3,167,059
AUXILIARY VALVES FOR INTERNAL
COMBUSTION ENGINES
John Love, West Orange, N.J.
(37 Boehm Ave., Mount Tabor, N.J.)
Filed Nov. 21, 1961, Ser. No. 153,881
1 Claim. (Cl. 123—75)

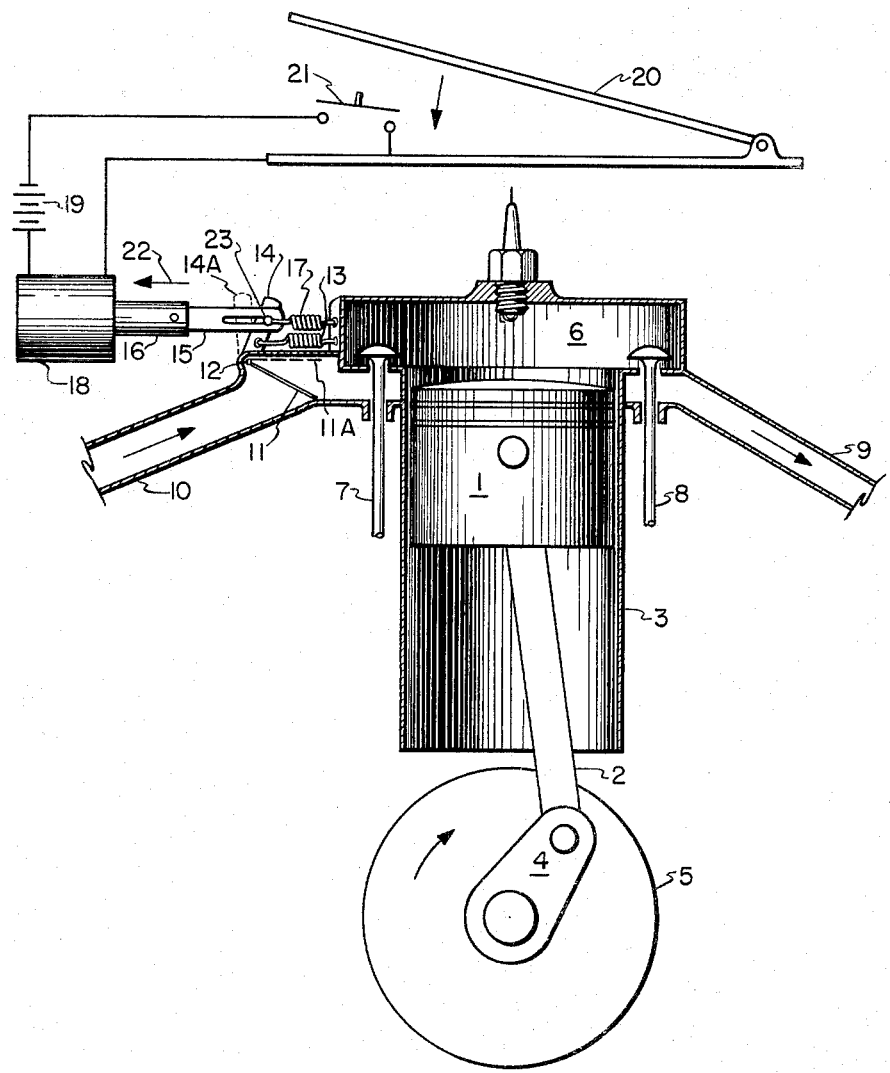

This invention relates to internal combustion engines and primarily to racing type engines of the gasoline driven type.

It is well known to the arts that, by retarding the closing of the exhaust valve and advancing the opening of the intake valve in a four cycle internal combustion engine, increased speed and power can be obtained. However, although we unquestionably get increased speed and power, it has a serious disadvantage; it is impossible to get a slow, smooth idle adjustment. An engine of that class must be adjusted to a considerably fast idling speed for reasonably smooth operation or it might be classified as a compromise between minimum speed and tolerable roughness. This disclosure will show how a full race type of engine, with the addition of the apparatus hereinafter described, can be adjusted to a slow, smooth idle speed equal to, or better than anything we have had heretofore.

Before going into a detailed description of this invention I will discuss the cause of this erratic idling. In a four cycle engine of the class under discussion, there is a time period after the opening of the intake valve and before the closing of the exhaust valve when both valves are open at one and the same time. The exhaust gases in the cylinder have, during that said time period, a choice of two exits, one through the exhaust valve against an opposing pressure up to and above ten pounds per square inch and the other through the intake valve aided by a suction equal to an inverse pressure up to and beyond eight pounds per square inch. It is, therefore obvious that during that same time period more exhaust gases will pass through the intake valve back into the intake manifold than will pass out through the exhaust valve into the exhaust system. The amount of these exhaust gases that pass back into the intake manifold increase with the reduction of motor speed and contaminate the fuel mixture passing into the adjacent cylinders, therefore, no smooth slow idle adjustment can possibly be obtained.

The primary object of this invention is to provide an intake means that will allow the vaporized gas and air mixture to pass from the intake manifold into the engine cylinders but not allow it to be returned.

Another object of this invention is to provide a means wherein the main intake valve timing can be so adjusted that the said main intake valve would be opened to its maximum at the very beginning of the intake time period.

A further object is to provide a means to semi-automatically control the use of this invention as hereinafter disclosed. Other objects and advantages will be obvious from the following description.

In the drawings, the figure illustrates by way of exaggerated semi-schematic drawing and schematic circuit diagram, a four cycle internal combustion engine.

The engine comprises a piston head 1, a connecting rod 2, a cylinder 3 with a crank 4 and a flywheel 5 and a compression chamber 6, an open intake valve 7 and an open exhaust valve 8, an exhaust pipe 9, an intake pipe 10 with a flat valve 11 mounted and fixed on an axle 12 and springingly held closed by pull spring 13 through the arm 14 which is also mounted and fixed on the said axle 12. A slotted connecting rod 15, a solenoid plunger 16, a pull spring 17 connected to the said plunger 16, a solenoid coil body 18, a battery 19, a lever 20 representing an automobile accelerator foot control and a normally open switch 12 which is actuated only when the said accelerator 20 is in its maximum actuated position. For the sake of simplicity, no carbureters, throttle valve, throttle valve linkage to accelerator, no ignition system or valve actuating means, and only one cylinder of a multiple cylindered engine are shown.

In operation, the figure represents a modified four cycle internal combustion engine of the class under discussion, with valves and piston in a position near the end of the exhaust stroke and after the opening of the intake valve. At this position both valves are open at one and the same time. The exhaust gases in the compression chamber 6 must pass out through the exhaust valve 8 as the intake passageway through the open intake valve 7 is blocked by the closed flat valve 11. This flat valve 11, which is delicately held normally closed by the pull spring 13, offers negligible opposition to the normal passage of the fuel from the carbureter to the compression chamber 6 during the input period.

A study of the figure will show that when the accelerater pedal 20 is pressed to its maximum, or some predetermined or prearranged position, it closes switch 21 which energizes solenoid 18 through the battery 19 and moves the solenoid plunger 16 in the direction of the arrow 22 thereby moving the flat valve 11 into the broken line position 11A through the slotted connecting rod 15 and arm 14. In this position the influence of the flat valve 11A is not effective. Also a study of the flat valve linkage 12, 14, 14A and 23 to the slotted connecting rod 15, will show how the said flat valve can be opened freely due to the ability of the connecting pin 23 on arm 14 to slide in the slot in the said slotted connecting rod 15.

While there has been described what is, at present, considered to be the preferred embodiment of this invention, it will be understood that various modifications thereof may be made within the true spirit and scope of this invention as defined in the following claim.

I claim:

In an internal combustion engine, a combustion chamber having a fuel input manifold and an exhaust outlet manifold, a fuel intake valve at the entrance to the said combustion chamber and an exhaust outlet valve at the exit of the same said combustion chamber, said fuel intake valve being timed to open before upper dead center and the said exhaust outlet valve being timed to close after upper dead center, a closing valve in the said fuel input manifold to close the opening between the said exhaust outlet manifold and the said fuel input manifold, said closing valve opening substantially freely for the inward flow of fuel to the said combustion chamber but closes completely against exhaust blow back from the said exhaust outlet manifold, an accelerator lever, electro-mechanically connected to the said closing valve in such a manner that the total movement of the said accelerator lever must take place before the said closing valve snaps open, said closing valve being so designed that, when open, it offers no opposition to the free flow of fuel to the said combustion chamber.

References Cited in the file of this patent
UNITED STATES PATENTS

| | | |
|---|---|---|
| 1,347,199 | Winters | July 20, 1920 |
| 1,347,598 | Sturm | July 27, 1920 |
| 1,733,975 | Osterhout | Oct. 29, 1929 |
| 2,001,941 | Rowe et al. | May 21, 1935 |
| 2,035,237 | Kushinsky | Mar. 24, 1936 |
| 2,279,413 | Read | Apr. 14, 1942 |
| 2,902,221 | Hajny | Sept. 1, 1959 |

FOREIGN PATENTS

| | | |
|---|---|---|
| 421,011 | Italy | Oct. 1, 1946 |